Figure 1:
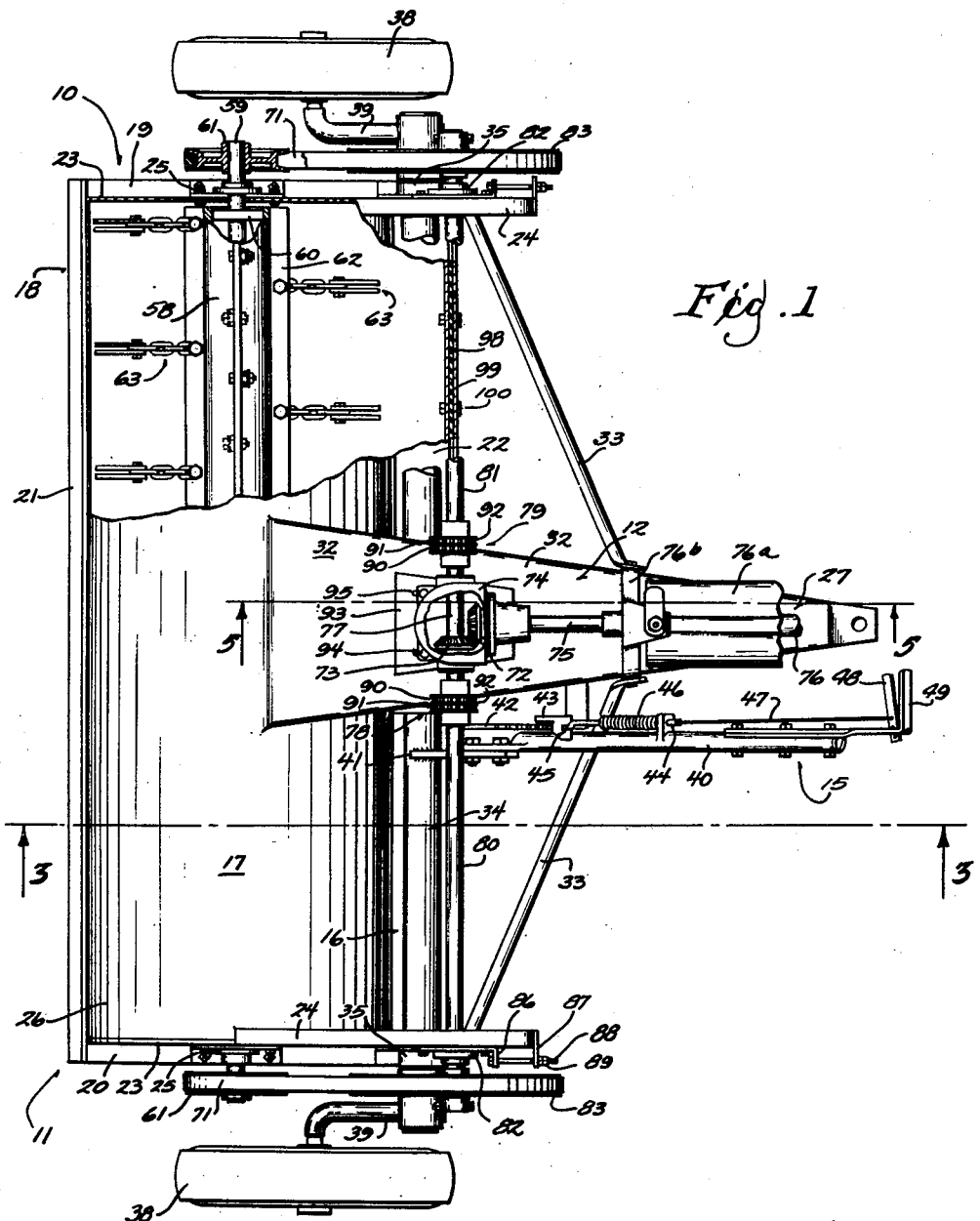

Feb. 15, 1955  S. C. HETH  2,701,941
STALK SHREDDING MACHINE
Filed June 27, 1951.  4 Sheets-Sheet 1

INVENTOR
SHERMAN C. HETH
BY
ATTORNEY

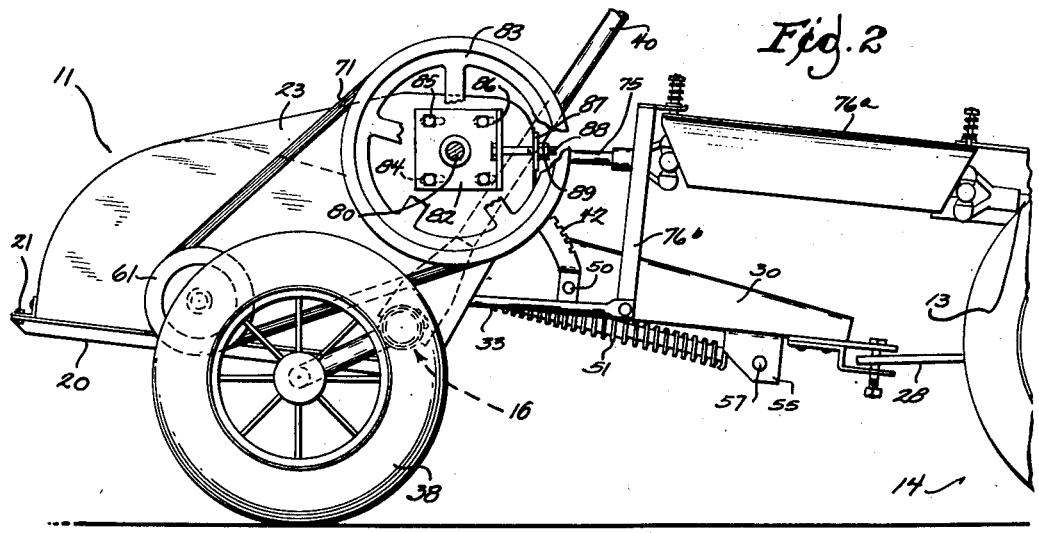
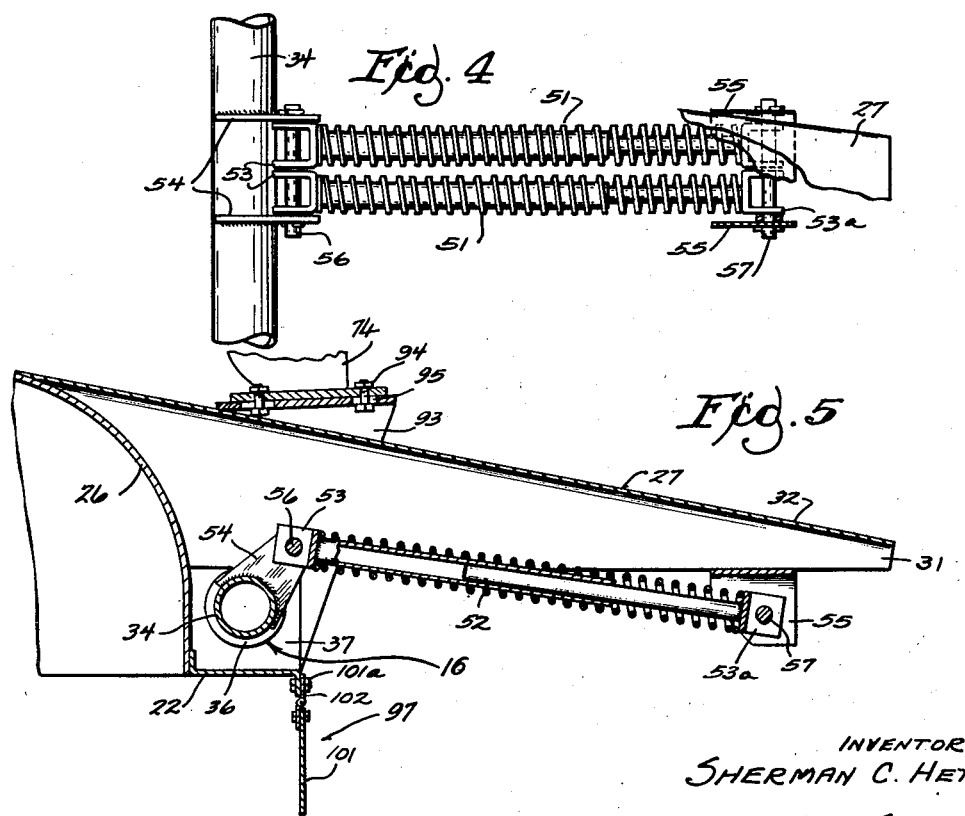

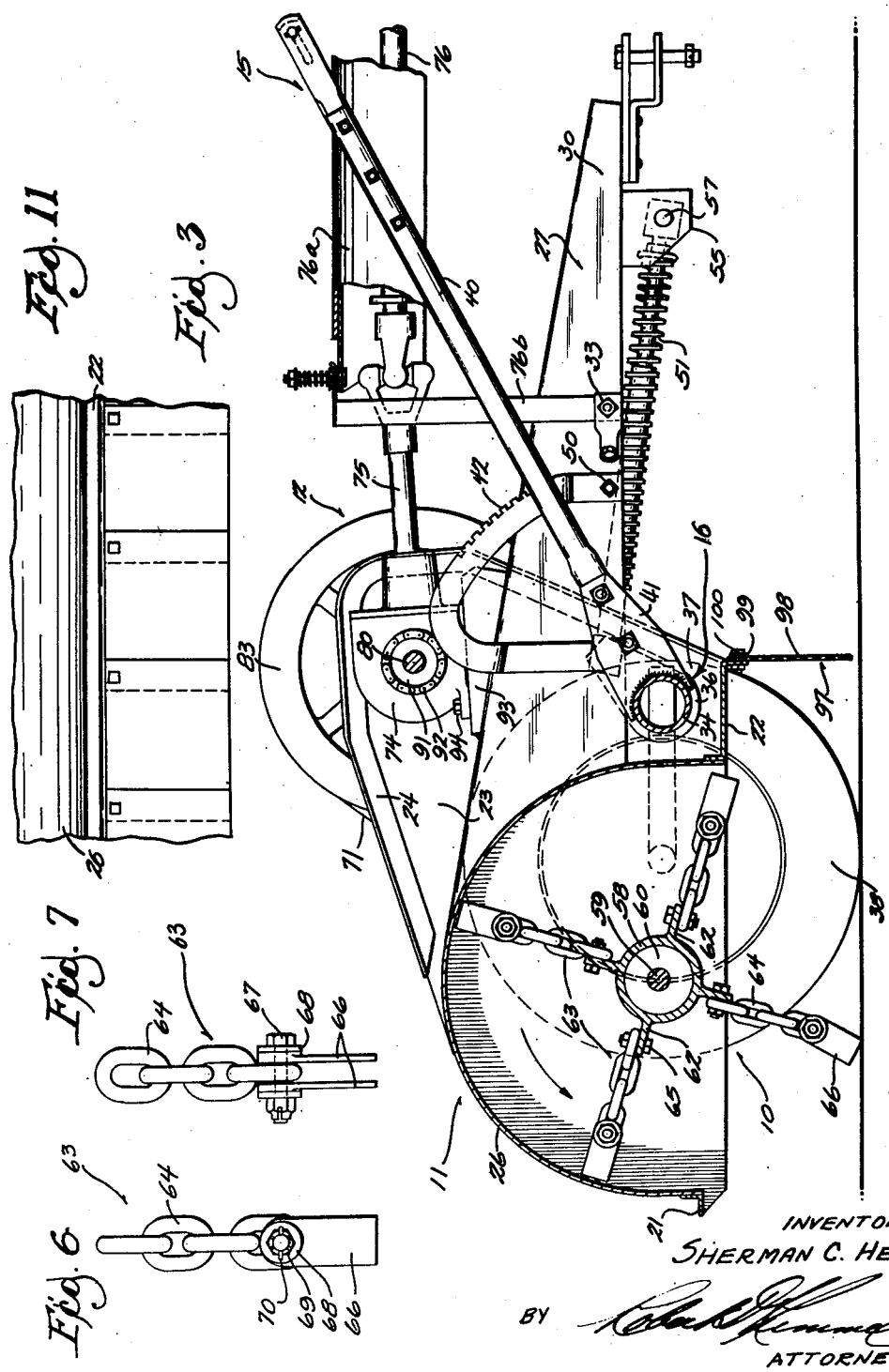

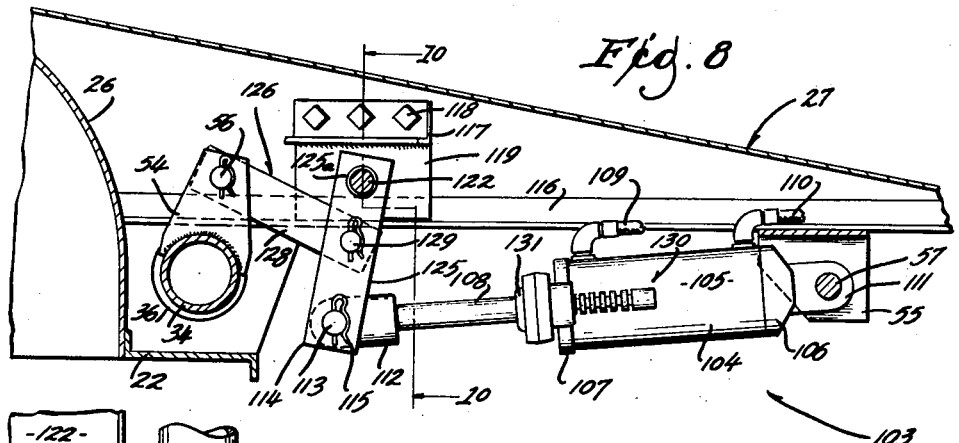
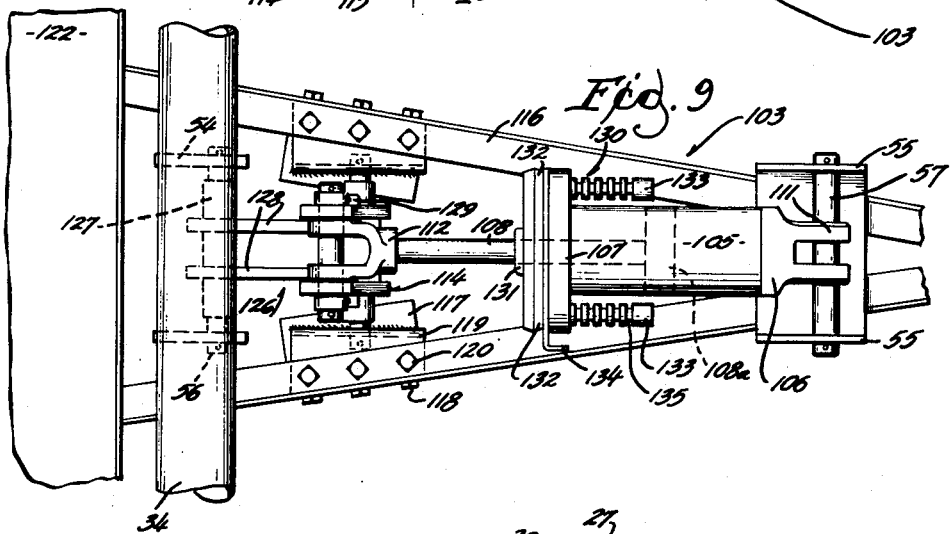
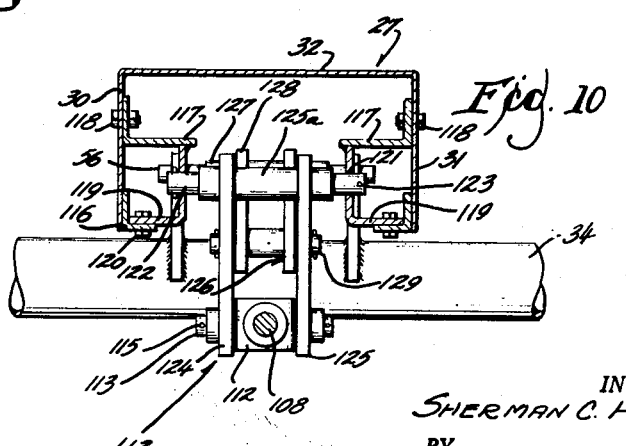

United States Patent Office 2,701,941
Patented Feb. 15, 1955

2,701,941

STALK SHREDDING MACHINE

Sherman C. Heth, Racine, Wis., assignor to J. I. Case Company, Racine, Wis., a corporation of Wisconsin Application June 27, 1951, Serial No. 233,729

4 Claims. (Cl. 55—118)

The present invention relates to a machine for shredding or pulverizing plant stalks.

Working the heavy stalks of hybrid corn and other crops back into the soil is a common farm problem, and a practical solution is especially important in the Corn Belt, for the corn borer larvae winter over from one season to the next in the stalks or similar crop residues. Many growers, and especially those who recognize the necessity of utilizing every practical means for controlling the borers, expressed the need for a machine which would effectively disintegrate corn stalks or other crop residues, having a three fold purpose: To make clean plowing and subsequent tillage easier, to hasten the rotting of the material, and to kill as many corn borers as possible.

The object of the present invention therefore is to provide a machine for reducing crop residues into such fine particles that the resulting plowing operation can be done swiftly and effectively, substantially all of the crop residues being covered by earth.

A further object is to provide a machine adapted to be drawn by a tractor or other suitable propelling means, and including a power driven rotor provided with centrifugally extended beaters.

A still further object is to provide a shredding mechanism having replaceable hammers for working the plant material between as well as in the rows.

Another object is to provide means for effectively and efficiently driving the rotor from the power take-off of the tractor or other propelling means.

Still another object is to provide a stone guard for protecting the driver of the tractor or other propelling means from flying particles, such as stones, picked up by the rotor.

Other objects and advantages will be apparent from the following description taken in conjunction with the accompanying drawings and from the appended claims.

In the drawings: Fig. 1 is a plan view of a stalk shredding machine embodying the present invention, with parts broken away to show details of construction; Fig. 2 is a right-side elevational view of the machine shown in Fig. 1, showing the machine in combination with a tractor, with parts broken away to show details of construction; Fig. 3 is a right-side elevational view taken on the line 3—3 of Fig. 1, slightly enlarged; Fig. 4 is a plan view of the counterbalance means visible in Fig. 2, slightly enlarged; Fig. 5 is a right-side elevational view taken on the line 5—5 of Fig. 1, with parts removed; Fig. 6 is a right-side elevational view, slightly enlarged, of a beater shown in Fig. 3; Fig. 7 is a front view of the beater shown in Fig. 6; Fig. 8 is a view similar to Fig. 5, slightly enlarged, showing a modification of the present invention; Fig. 9 is a bottom view of a structure shown in Fig. 8; Fig. 10 is a sectional view taken on the line 10—10 of Fig. 8; and Fig. 11 is a fragmentary front view of Fig. 3, showing a further modification.

Referring to Figs. 1, 2, and 3 of the drawings the machine embodying the present invention comprises in the present instance a shredding mechanism 10 rotatably carried transversely to the direction of travel by a movable draft frame 11. A power transmitting means 12 is carried by the movable draft frame 11 for transmitting the rotary motion of a power take-off 13 of a tractor or other suitable propelling means 14, only partly shown, to the shredding mechanism 10, as will appear hereinafter. An adjusting means 15 is provided on the draft frame 11 for raising or lowering the shredding mechanism 10 with respect to the ground, as will be fully described hereinafter.

As herein shown, the movable draft frame 11 comprises in the present instance, a crank axle 16 and a supporting frame 17. The supporting frame 17 includes a substantially rectangular framework 18 formed of side angle members 19 and 20, a rear angle member 21, and a forward Z member 22. Side members 23, formed of sheet metal or other suitable material and reinforced by angle irons 24, are secured to the respective lateral sides 19 and 20 of the framework 18 and extend forwardly and upwardly therefrom. Aligned bearings 25 are carried rearwardly in the side members 23 for rotatably supporting the shredding mechanism 10 transversely therebetween. A substantially semi-circular guard 26, formed of sheet metal or other suitable material, is secured to angle member 21 and Z member 22 and between the side members 23 above the shredding mechanism 10 so that the guard 26 is substantially coaxial with the shredding mechanism for protecting the driver of the propelling means from flying particles picked up by the crushing mechanism, as will be more clearly brought out hereinafter.

A drawbar 27, secured as by welding or the like to the guard 26 substantially midway of the side members 23, extends forwardly therefrom and is adapted to have the usual connection made thereto for attachment to a drawbar 28 of the tractor or any other suitable propelling means 14. The drawbar 27 is formed in the present instance of a rearwardly diverging box-like channel section having sides 30 and 31 and a top portion 32, the sides 30 and 31 being formed rearwardly so as to fit the curvature of the guard 26. For bracing the drawbar, members 33 are provided secured between the respective side members 23 and sides 30 and 31 of the drawbar.

For movably supporting the supporting frame 17, the crank axle 16 is provided, as previously mentioned, and comprises in the present instance an axle 34 journaled in aligned bearings 35 forwardly of the guard 26 and supported substantially intermediate the ends thereof in bearings 36 carried by brackets 37 depending from sides 30 and 31 of the drawbar. Carrying wheels 38 are provided which are rotatably journaled on laterally extending portions of aligned parallel arms 39 which in turn are secured adjacent the respective ends of the axle 34 laterally of the side members 23.

The adjusting means 15, as previously suggested, is provided for regulating the position of the frame 17 and consequently of the shredding mechanism 10 with respect to the ground as by regulating the rotation of the axle 34 in the bearings 35 and 36. An actuating arm 40 of the adjusting means 15 is secured to a bracket 41 fixed to the axle 34 and accommodates forwardly a toothed arcuate rack 42 in a guide arm 43 secured to the arm 40. A rod 44 is carried adjacent and parallel to the arm 40 and carries adjacent its lower end a dog 45 which is urged by means of a spring 46 into cooperative engagement with the teeth of the toothed rack 42. A wire or other suitable means 47 connects the rod 44 to a lever 48 which is pivotally secured adjacent a hand grip 49. The toothed rack 42 is secured by means of bolts or any other suitable means 50 to the side 30 of the drawbar 27.

To easily enable the operator to raise the supporting frame 17 in relation to the ground, assisting springs 51 are provided substantially enclosed within the drawbar 27. The springs 51 respectively encircle telescopic guides 52 which in turn have secured adjacent the opposite ends thereof suitable supporting clevises 53 and 53a (see also Figs. 4 and 5). Upwardly extending arms 54 are fixed to the axle 34 and depending brackets 55 extend from the sides 30 and 31 of the drawbar 27 for pivotally supporting springs 51 in compression therebetween by means of pins 56 and 57, pin 56 pivotally supporting the clevises 53 between the arms 54 and pin 57 pivotally supporting the clevises 53a between the arms 55. By this construction it will be apparent that the supporting frame 17 can be easily raised or lowered from a transport position to an operative position by rotating or turning the axle 34 in the bearings 35 and 36 as by swinging the arm 40 either forwardly or rearwardly on the rack 42. It will be further apparent that while the adjusting means can raise the carrying frame with respect to the ground, the weight of the carrying frame alone is sufficient to overcome the force exerted by the springs 51. The frame 17 will consequently bias itself and the shredding mechanism 10 downwardly thereby raising the wheels 38 when the dog 45 is withdrawn from the teeth of the rack 42.

The shredding mechanism 10, which is rotatably supported transversely in bearings 25 as previously suggested, includes in the present instance a rotor 58, preferably formed of a cylindrical metal tube, and stub shafts 59 fixed in spacers 60 which in turn are secured as by welding or the like into the respective ends of the rotor 58 so that the rotor is substantially co-axial with the stub shafts 59. The stub shafts 59 are rotatably supported in the bearings 25 and are provided adjacent their ends laterally of the bearings 25 with pulley wheels 61. Rotor 58 has secured as by welding or any other suitable means to the periphery thereof substantially radial ribs 62 extending the length of the rotor for attachment thereto in spaced relationship of beaters 63. The rotor disclosed in the present embodiment includes four equally spaced ribs, although it will be understood that the number of ribs employed is a mechanical detail and is not considered the gist of the present invention.

The beaters 63 in the present instance are preferably in the form of chains 64 which are secured to the ribs 62 by means of bolts or other suitable connections 65. The chains 64 are secured in equally spaced relationship on the individual ribs 62, but the chains 64 of one rib are staggered with respect to the chains of the other ribs so as to present a somewhat spiral effect or pattern. As specifically seen in Figs. 6 and 7 each chain 64 is provided with a pair of hammers 66. The hammers 66 are pivotally secured by means of a bolt or other suitable means 67 which extends through the last link of the chain so as to pivotally hold the hammers on opposite sides of the link. Suitable washers 68 are provided for well-known purposes and a nut 69 is threaded on the bolt 66 and locked against rotation by means of a cotter pin or the like 70. When the rotor is revolved so as to extend the beaters by centrifugal force, the beaters, because of this staggered relationship, will do a more efficient job of shredding the plant material passed over owing to the fact that the beaters of one rib will strike the plant material substantially simultaneously at points remote from the points of contact of the beaters of the other ribs, assuring thereby that substantially all plant material passed over will be acted upon by the beaters besides resulting in an even load or resistance to the power source. It will also be appreciated that the hammers 66 are subject to the most wear in normal operations. By pivotally securing the hammers to the last links of the chains 64, it is a relatively easy job to replace the hammers when conditions warrant by removing the bolts 67, substituting new hammers, and then replacing the bolts.

It will be appreciated that the power requirement for a machine of this type is extremely high, the rotor in the present instance being rotated approximately 1800 R. P. M.; therefore, it has been found expedient to use more than one belt drive to satisfactorily transmit the necessary amount of power for driving the rotor. It has also been found that two belt drives positioned together at one side would require a fairly heavy shaft to transmit the resultant torque, and consequently the bearing loads resulting from the belt pull upon the driving shaft and the rotor stub shafts would be correspondingly high requiring therefore, a heavier and more bulky machine. By dividing the power requirement between two belt drives, one on each end of the rotor, the bearing loads and the weight of the shaft necessary to carry the driving pulleys can be reduced and the weight of the machine better distributed than would be possible if the necessary double drive were located at one end only.

Towards this end, the stub shafts 59 are provided laterally of the bearings 25 with pulley wheels 61, as previously suggested, and torque is applied to the rotor 58 from the power take-off 13 of the tractor 14 by means of the power transmitting means 12 and driving belts 71. The power transmitting means 12 includes, in the present instance, gearing preferably in the form of bevel gears 72 and 73 enclosed in a gear box 74. An input shaft 75 is fixed with the gear 72 adjacent one end thereof and extends forwardly from the gear box 74 for universal connection with a power take-off transmitting shaft 76 of any conventional or suitable construction, which in turn is universally connected to the power take-off 13 of the tractor 14. A protective shield 76a of any well known or suitable construction is provided for well-known purposes between the tractor 14 and a standard 76b extending upwardly from the drawbar 27. The gear 73 is nonrotatably fixed on a shaft 77 which is rotatably supported transversely in the gear box 74 so as to position gear 73 in meshed relationship with respect to gear 72. The transverse shaft 77 extends laterally from opposite sides of the gear box and is drivingly connected adjacent its respective ends by means of flexible couplings 78 and 79 to transverse shafts 80 and 81 respectively. Transverse shafts 80 and 81 respectively are rotatably supported in bearing plates 82 so as to protrude laterally therefrom, the bearing plates 82 being adjustably secured to the side members 23, as will be explained more fully hereinafter. Fixed adjacent the lateral ends of the shafts 80 and 81 respectively, are pulley wheels 83 which are carried in driving relationship with respect to pulley wheels 61 and operatively connected therewith by means of the belts 71. For adjusting the tension of the belts 71, the bearing plates 82 are slidably secured in guideways 84 formed in the side members 23 by means of bolts or the like 85. To prevent the tension of the belts 71 from working or sliding the bearing plates 82 rearwardly in the guideways 84, the bearing plates are provided forwardly with laterally extending flanges 86 which are secured with laterally extending brackets 87 of the side members 23 by means of bolts or the like 88 and adjustable lock nuts 89. It will be apparent that by adjusting the nuts 89 on the bolts 88, that the bearing plates can be shifted into and fixed in selected positions within the limits of the guideways 84 so as to tighten or loosen the belts 71 as required, the plates being then clamped by bolts 85.

To compensate for any slight misalignment between the transverse shaft 77 and shafts 80 and 81, the flexible couplings 78 and 79 are provided, as previously suggested. The couplings 78 and 79 comprise, in the present instance, substantially similar sprockets 90 and 91 of any suitable construction fixed respectively adjacent the ends of the transverse shaft 77 and the ends of shafts 80 and 81. Double link endless chains 92 of any well-known construction are provided for engagement with the teeth of the sprockets 90 and 91 for driving the shafts 80 and 81 from the shaft 77, sufficient play being allowed between the chains 92 and the sprockets to absorb any misalignment between shaft 77, and shafts 80 and 81 in a manner well known in the art.

The gear box 74 is slidably secured on a channel-like support 93 which is fixed, as by welding or the like, to the top portion 32 of the drawbar 27. The gear box 74 is provided with downwardly extending bolts 94 which are accommodated in guideways 95 formed in support 93. Conventional nuts 96 are threaded on the bolts 94 for securing the gear box on the support 93. By loosening the nuts 96 the gear box can be adjusted forwardly or rearwardly within the limits of the guideways 95 for adjustably positioning the gear box with respect to the bearing plates 82 for preventing any misalignment between the shaft 77 and shafts 80 and 81 sufficient to strain the limits of the flexible couplings 78 and 79.

For protecting the operator of the tractor from flying particles picked up by the shredding mechanism and thrown forwardly between the frame 17 and the ground, a stone guard 97 is provided. As best seen in Figs. 1 and 3 the stone guard includes in the present instance a curtain 98 secured between the forward edge of the Z member 22 and a member 99 by means of bolts or other suitable means 100. The curtain extends downwardly therefrom so as to be positioned substantially edgewise to the ground and in close proximity thereto. Curtain 96 is preferably formed of pliable material such as rubber, leather, or the like for permitting the curtain to be hung in close proximity to the ground while still permitting the plant material forwardly of the curtain to be passed over upon forward movement of the draft frame 11, the curtain being sufficiently supple to easily yield to the plant material encountered. It will be further apparent that material such as rubber, leather, or the like possesses certain shock absorbing characteristics which in the present instance prevent ricocheting of these flying particles rearwardly off the stone guard. It will be further apparent that while we have shown the stone guard as being formed of pliable material such as rubber, leather or the like, rigid material such as metal, wood, or the like is adaptable for use as a stone guard. In such cases it is contemplated that a stone guard 101 formed in the present instance of any suitable metal can be swingably secured by means of bolts 101a or the like to the Z member 22 by means of a conventional or suitable hinge 102 (see Fig. 5) so as to permit the guard to swing in a fore and aft direction for permitting the plant material forwardly of the curtain to swing the curtain 101 upon contact therewith sufficiently rearwardly to pass thereunder when the movable frame is being propelled forwardly, while still permitting the curtain to be hung in close proximity to the ground.

In operation it will be appreciated that the height of the shredding mechanism is under complete control of the operator at the operator's station on the tractor. For best results it has been found that the shredding mechanism should be lowered sufficiently so that the hammers 66 are barely in contact with the ground. However, the exact position of the shredding mechanism with respect to the ground should be determined by experiment, the preferable location depending upon the condition of the crop and the amount of power available. To transport the machine, the shredding mechanism is raised with respect to the ground by means of the adjustment means 15 as previously described and the rotary motion from the power take-off shaft 13 to the shredding mechanism is interrupted by declutching the power take-off shaft 13 in a manner well known in the art. The machine can now be pulled from place to place without the shredding mechanism being rotated.

Figs. 8, 9, and 10 show an embodiment of the present invention wherein a hydraulically controlled adjustment means 103 for regulating the height of the rotor with respect to the ground by controlling the rotation of the axle 34 in bearings 35 and 36 is employed. More specifically, a hydraulic cylinder 104, preferably of the type commonly employed with agricultural machinery, is provided and comprises a cylindrical portion 105 having head portions 106 and 107 and an extensible rod 108 which protrudes from the cylindrical portion. The rod 108 is provided with a suitable piston 108a, so that the rod 108 is responsive to fluid pressure selectively delivered into opposite ends of the cylindrical portion by means of conduits 109 and 110. The head 106 is provided with a suitable clevis 111 which is received by the hereinbefore described pin 57 between the brackets 55. The opposite end of the rod 108 is provided with a suitable clevis 112 which is received by a pin 113 which is rotatably carried between the adjacent arms of a swingable yoke 114 adjacent one end thereof. The pin 113 is prevented from axially moving in the yoke 114 by means of suitable cotter pins or the like 115 thereby locking the pin 113 from accidental displacement out of the yoke 114. Suitable angle irons 116 are secured as by welding or the like to the inner surfaces of the sides 30 and 31 of the drawbar 27 adjacent the lower edges thereof and angle irons 117 are secured to the side members 30 and 31 respectively above and substantially parallel to angle irons 116 by means of bolts or the like 118. Angle irons 119 are secured as by welding or the like to angle irons 117 and to the angle irons 116 as by bolts or the like 120. Angle irons 119 are provided with suitable openings 121 for receiving a shaft 122 therebetween, and suitable cotter pins or the like 123 are provided adjacent the ends of the shaft 122 for preventing accidental displacement of the shaft out of the angle irons 119. The yoke 114 is provided with depending arms 124 and 125 which are secured adjacent the upper ends thereof to a bearing sleeve 125a, bearing sleeve 125a being journaled on shaft 122 so as to swing or rock about the axis thereof. A push link assembly 126 comprising a bearing sleeve 127 and substantially parallel arms 128 secured as by welding or the like to the bearing sleeve 127 is pivotally secured by means of a pin 129 between the arms 124 and 125 of the swingable yoke 114 substantially midway between the axis of the shaft 122 and pin 113. The hereinbefore mentioned pin 56 is received in the bearing sleeve 127 and secured between the arms 54 of the axle 34 by means of suitable cotter pins or the like so that upon expansion of the hydraulic cylinder the yoke 114 will be swung about the shaft 122 in a clockwise or lifting direction, see Fig. 8, which in turn moves the push link assembly 126 rearwardly so as to effect a counterclockwise movement of the axle 34 by means of the arms 54. Upon retraction of the rod 108 in cylindrical housing 105 the weight of the shredding machine biases the axle 34 to move in a clockwise direction so as to lower the rotor with respect to the ground and the lowering of the rotor with respect to the ground is limited only by the extent to which the rod 108 is retracted into the cylindrical housing 105. It will now be apparent that expedients have been provided for hydraulically moving the rotor with respect to the ground and various well-known hydraulic controls are contemplated as adapted for use with this construction for axially controlling the position of the piston within the cylindrical portion 105 of the cylinder. With such controls the depth of plowing can be readily controlled merely by manipulating the hydraulic controls of the tractor so as to hold the piston in the position necessary to maintain the correct position of the rotor with respect to the ground.

Other hydraulic systems operate in such a manner to move the rod 108 the limit of its travel in one direction. This type of system is shown and designated by the number 130. The limit stop 130 is of any well known or conventional construction and includes in the present instance a stop 131 slidable on the rod 108 and provided with lateral portions 132 which have rods 133 fixed therein. The rods 133 are slidable in the head 107 and the stops 131 are locked in various positions with respect to head 107 by means of a spring-loaded latch 134 engageable with circumferential grooves 135 formed in the respective rods 133, the stop 131 abutting clevis 112 upon the arm's being retracted. As will be apparent various positions of the slidable latch 134 on the rods 133 will effect the various positions of the crank axle 34 of the rotor 58 when the clevis 112 is against the stop 131. Since the height of the rotor with respect to the ground depends upon the position of the crank axle 34, the selected position for the rotor can be reached merely by actuating the hydraulic mechanism to bring the clevis 112 against the stop 131 in whatever position has been selected by the spring latch 134. This type of operation is convenient because the position of the rotor with respect to the ground will always be the same and no attention need be given to the rotor when lowering it into a working position.

Having now described my invention, what I claim as new and desire to be protected by Letters Patent of the United States is:

1. In a crop shredding machine comprising a downwardly open channel-like casing, means connected to said casing adjacent its ends for supporting the same for passage over the ground, a downwardly open channel-like drawbar substantially normal to the casing and permanently united therewith substantially midway between the ends thereof, a shredding rotor journaled in the casing having a pulley at each end thereof, a belt drive to the rotor adjacent each end of the casing and including a pair of shafts forwardly of and substantially parallel to said rotor and extending inwardly toward said drawbar, said shafts having pulleys belt-connected to said rotor pulleys, bearings for said shafts disposed at the ends thereof adjacent the ends of said casing and adjustable forward and back for tensioning said belt drives, a gear box mounted on said drawbar into which said shafts are connected, and said gear box being adjustable on said drawbar in a direction substantially parallel to the adjustment of said bearings to align said shafts and gear box when said bearings are adjusted.

2. A device according to claim 1 having flexible couplings interposed in said shafts adjacent said gear box to provide for slight misalignment of said shafts without binding in said gear box.

3. A device according to claim 1 having a curtain of flexible material depending from the forward edge of said downwardly open channel-like casing into close proximity to the ground.

4. A device according to claim 1 having a curtain member hingedly supported on the forward edge of said downwardly open channel-like casing and extending into close proximity to the ground.

References Cited in the file of this patent

UNITED STATES PATENTS

| 1,698,724 | Johnston et al. | Jan. 15, 1929 |
| 2,017,524 | Bolens | Oct. 15, 1935 |
| 2,066,610 | Carlin | Jan. 5, 1937 |
| 2,531,732 | Hoffman | Nov. 28, 1950 |
| 2,556,446 | Roach | June 12, 1951 |
| 2,585,296 | Bennett et al. | Feb. 12, 1952 |